JOSEPH ZEMANEK, JR.
INVENTOR

BY William D. Jackson
ATTORNEY

United States Patent Office 3,511,334
Patented May 12, 1970

3,511,334
ACOUSTIC WELL LOGGING TOOL
Joseph Zemanek, Jr., Dallas, Tex., assignor to Mobil Oil
Corporation, a corporation of New York
Filed Dec. 2, 1968, Ser. No. 780,510
Int. Cl. G01v 1/40
U.S. Cl. 181—.5          2 Claims

ABSTRACT OF THE DISCLOSURE

This specification discloses an acoustic well logging tool. The logging tool includes a transducer which is secured to a support member in the tool by means of bonding material covering the active face of the transducer. The bonding material has a flattened outer face opposite the active face of the transducer in order to provide an increased directivity of the survey signal and signal-to-noise ratio.

Background of the invention

This invention relates to acoustic well logging tools and, more particularly, to the mounting of acoustic transducers within such tools.

It is a conventional practice to survey a well or the subterranean formations penetrated thereby by acoustic logging techniques in which acoustic signals, normally at frequencies predominantly in the ultrasonic range, are generated and received by a logging tool run through the well. One relatively new and highly successful acoustic logging technique involves the generation and reception of directional acoustic pulses, usually in a rotational mode, in order to obtain an indication of the configuration of the well and/or the presence or absence of anomalies in the wall of the well or within the adjacent formations. Such acoustic logging may be carried out utilizing separate transducers for transmission and reception, as described in U.S. Patent application Ser. No. 641,988 by Zemanek; or a single transducer, commonly termed a "transceiver," for both transmission and reception, as disclosed in U.S. Pat. No. 3,406,779 issued to Zemanek et al. While satisfactory well logs may be obtained by either technique, it usually is most desirable to utilize a logging tool employing a transceiver. In this regard, the transceiver is oriented within the well such that its directional transmission path is normal to the subterranean interface under investigation, e.g., the wall of the well. The transmitted energy therefore strikes this interface at an angle of incidence of zero or near-zero such that the reflected energy follows the same general path back to the transceiver as the transmitted energy. Thus, the transceiver-type logging tool may be utilized without adjustment in wells of widely varying diameters.

A desideratum in such acoustic logging operations, either with transceivers or with separate transmitting and receiving transducers, is a high signal-to-noise ratio. By signal-to-noise ratio is meant the ratio of the peak amplitude of the survey signal to the amplitude of background noise picked up by the receiving transducer or the transceiver. This background noise is due predominantly to the transmission of acoustical energy into structural elements of the logging tool from which it travels to the transceiver or receiving transducer. Thus, the signal-to-noise ratio may be increased by acoustically insulating the transducer or transducers from such structural elements to reduce the background noise.

In addition to a good signal-to-noise ratio, it is desirable that the survey signal be highly directionalized. Stated otherwise, the predominant amount of transmitted and received energy should fall within a relatively narrow, confined path. Under this relationship, each pulse of transmitted energy contacts a small area of the interface under investigation thus providing for good resolution of detected anomalies.

Summary of the invention

In accordance with the present invention, there is provided a new and improved acoustic logging tool including a transducer which is mounted securely therein and yet provides for good directivity of the survey signal and a high signal-to-noise ratio. The transducer is mounted on a support so as to have an outwardly oriented active face. A bonding material covers the transducer to securely fasten the transducer to the support. This bonding material has a flattened outer face opposite the active face of the transducer. By providing this flattened face on the outer surface of the bonding material, the signal-to-noise ratio and the directivity of the survey signal are increased.

Description of the specific embodiments

Figures 1, 2, 3:
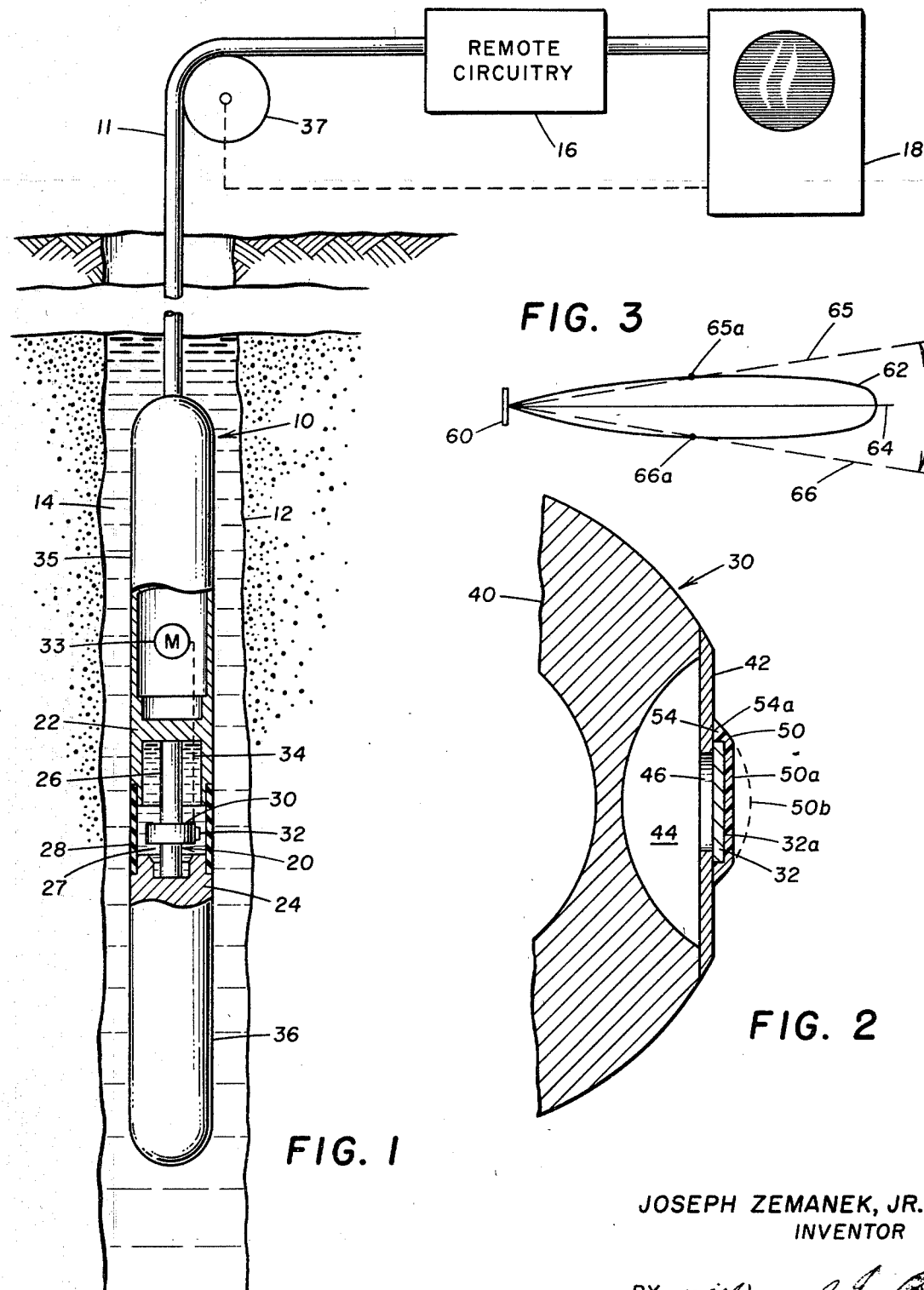
FIG. 1 is a schematic illustration, partly in section, of an acoustic logging system.
FIG. 2 is an illustration, partly in section, of a portion of the tool showing a transducer secured to a transducer support in accordance with the present invention.
FIG. 3 is an illustration of a directivity pattern of an acoustic transducer.

The invention will be described in detail with reference to the mounting of an acoustic transceiver in a logging tool. While the use of a transceiver usually will be preferred, it is to be recognized that the invention is also applicable to the mounting of separate transmitting and/or receiving transducers.

With reference to FIG. 1, there is illustrated schematically an acoustic logging system embodying the improved logging tool of the present invention. The system includes an elongated logging tool 10 which is shown as extended from a cable 11 within a well 12. The well 12 is filled with a fluid such as drilling mud indicated by reference numeral 14. The logging system also includes remote circuitry 16 at the surface and a suitable display means such as a cathode ray oscilloscope 18 upon which a facsimile of the wall of the well may be displayed.

The logging tool includes a support structure 20 which comprises upper and lower panels 22 and 24, respectively, and a reduced connecting member 26 extending between the panels. The panels 22 and 24 define a transceiver compartment 27 in the tool within which an acoustic transceiver 32 is mounted in accordance with the present invention. The transceiver compartment is provided with a peripheral window 28 which is relatively transparent to acoustic energy. The window 28 may be formed of a suitable material which desirably has an acoustic impedance close to the impedance of the well fluid 14. The transceiver compartment also is filled with a suitable coupling liquid which prevents the window from collapsing under the hydrostatic head of the well fluid and which desirably has an acoustic impedance close to that of the well fluid 14 and the window 28. By way of example, window 28 may be formed of a .05" thick Hycar rubber sleeve and the liquid may be a light oil such as SAE 10W motor oil.

A transceiver support 30 is mounted in the compartment 27 for rotational movement about the connecting member 26. The acoustic transceiver 32 is firmly mounted on the support 30 as described in greater detail hereinafter. The transceiver 32 is a directional electroacoustic transducer which is oriented such that its directional transmission path extends laterally from the tool normal to the axis of rotation of support 30. By way of example, the transceiver 32 may be a piezoelectric element of lead zirconate titanate having a resonant frequency within the range of one to two megahertz. By operating the transducer in a pulsed mode there is emitted a signal having a multi-frequency spectrum; that is, the signal may be represented in the frequency domain by a relatively broad spectrum of sinusoidal components. By the term "resonant frequency" is meant the frequency at which the maximum of these components occurs.

The logging tool also is provided with a prime mover such as an electric motor 33. A drive mechanism indicated by broken line 34 interconnects the prime mover and the transceiver support 30 so that the transceiver 32 may be rotated throughout a 360° scan of the well. The upper and lower sections 35 and 36, respectively, of the logging tool may be provided with suitable centralizing means (not shown) for positioning the tool concentrically within the well.

In operation of the system illustrated in FIG. 1, the logging tool is lowered into the well and the prime mover 33 is energized to rotate the transducer support 30 about the connecting member 26. The transceiver 32 is excited to generate pulses of acoustic energy which travel outwardly predominantly in a confined, narrow beam path normal to the wall of the well 12. For example, the transceiver may directionally transmit and receive an acoustic signal having a predominant frequency within the range of one to two megahertz. The transceiver may be rotated at 100 to 400 revolutions per minute and the signal pulses may be transmitted at a repetition frequency on the order of 2,000 times per second. A portion of the transmitted acoustic energy is reflected from the wall of the well and is detected by the transceiver and converted into representative signals such as electric pulses. These signals then are transmitted to the surface by suitable communication channels in the cable 11 where they are received at the surface by the remote circuitry 16 which functions in response to the signals to intensity modulate the beam of the cathode ray oscilloscope 18. The logging tool also is provided with position indicating means (not shown) which functions to transmit a position signal to the surface which is representative of the angular position of the transceiver within the well. This position signal operates to horizontally sweep the oscilloscope beam across the face of the oscilloscope in proportion to the angular position of the transceiver within the well. As the logging tool 10 is moved upwardly through the well, a depth indicating means such as measuring sheave 37 which is rotated by the cable 11 generates a depth signal which functions to control the sweep of the oscilloscope beam vertically across the face of the oscilloscope.

As the loggin gtool is moved upwardly or downwardly through the well and the transceiver 32 rotated throughout a 360° scan, a display is produced on the face of the oscilloscope which is correlated with the depth of the logging tool within the well. Whenever the beam of acoustic pulses generated by the transceiver 32 encounters an anomaly, such as a fraction in the wall of the well, the acoustic energy is not reflected directly back to the transceiver. When a pulse is not received by the transceiver the remote circuitry does not receive a representative signal to intensity modulate the beam of the oscilloscope and a gap is indicated on the face of the oscilloscope. The oscilloscope face thus presents a display of anomalies found in the wall of the well. For a more detailed description of a logging system of the type described here and its mode of operation, reference is made to U.S. Pat. No. 3,369,626 to Zemanek.

As noted previously, the transceiver should provide for a highly directionalized survey signal and also a good signal-to-noise ratio. These criteria must be met while at the same time providing for a secure mounting of the transceiver on the transceiver support. In accordance with the present invention, these conditions are satisfied by securing the transceiver to its support by a novel application of a bonding material, as illustrated in detail in FIG. 2.

With reference to FIG. 2, there is illustrated a sectional view of a portion of the transceiver support 30 and the transceiver 32. In order to reduce background noise, the transceiver support preferably will be of the type disclosed in the aforementioned U.S. Pat. No. 3,406,779. This transceiver support comprises an annular shaped main body portion 40 having a plate member 42 which is secured to the body portion 40 and bridges a chamber 44 therein. The chamber 44 normally will be filled with an elastomeric material (not shown), such as rubber, which is placed under a compressive stress. The plate is provided with a central aperture 46 therein which underlies the transceiver and also a plurality of apertures or chambers (not shown) around the transceiver in order to reduce energy transfer between the transceiver and the main body member of the transceiver support.

The transceiver 32 is secured to plate member 42 by means of a bonding material 50 which covers the transceiver and holds it to the plate member. Particularly suitable bonding materials are the various commercially available epoxy resins which exhibit good properties of adhesion with respect to the transducer and the structural material, normally metal, forming the plate 42 and which, in addition, are resistant to the coupling liquid in the transceiver compartment 27.

The bonding material is of a configuration such that it provides a flattened outer surface 50a opposite to the active face 32a of the transducer. By establishing this relationship between the active face of the transducer and the outer surface of the bonding material, the signal-to-noise ratio and the directivity of the transmitted energy are appreciably enhanced over that obtained by allowing the bonding material to remain in the configuration which normally would result from its application.

The transducer may be secured to the plate 42 by positioning the transducer over the aperture 46 and then applying the bonding material in a sufficient amount to cover the transducer. The epoxy resin or other bonding material typically will assume a meniscus-like shape such as that indicated by broken line 50b. The bonding material may be allowed to harden in this shape and the outer portion thereof then milled in a plane parallel to the active face of the transducer in order to form the flattened surface 50a. Alternatively, a mold may be used in order to allow the bonding material to initially harden in the shape indicated in FIG. 2. Usually, however, it will be desirable to utilize the former technique since this will provide a fillet portion of the bonding material as indicated by reference numeral 54. This provides an inclined outer surface, such as indicated by reference character 54a, which extends from the flattened outer face 50a to the transducer support and serves to alleviate any turbulence which may be caused by movement of the transducer through the coupling liquid. In this regard, as the transceiver support 30 is rotated, the bonding material presents a protrusion which tends to cause turbulence and cavitation in the coupling liquid. By providing an inclined outer surface of the bonding material in the direction of rotation of the transducer support this effect is minimized.

By securing the transducer to the transducer support in accordance with the present invention, the transducer is securely mounted on the transducer support and is protected by the covering of bonding material. In addition, by providing the flattened outer surface the transducer response, in terms of the directivity of the survey signal and the signal-to-noise ratio, is increased over the response obtained with a curved surface such as indicated by broken line 50b.

Turning now to FIG. 3, there is illustrated a directivity pattern which is representative of the response of a transducer 60 to transmitted or received energy. In FIG. 3 curve 62 is a polar plot of the pressure amplitude of transmitted or received energy versus angular displacement from a base-line 64 normal to the active face of the transducer 60. One measure of the directivity of a transducer is the angle $\theta$ through which a response of at least one-half of the maximum pressure amplitude is observed. Thus, as illustrated in FIG. 3, the directivity angle $\theta$ is defined by broken lines 65 and 66 which extend from the intersection of the base-line and the active face of the transducer 60 through points 65a and 66a on curve 62 which correspond to one-half of the maximum pressure amplitude of the generated or received acoustic signal.

In tests carried out with regard to the present invention, the directivity angle $\theta$ was observed for a transducer mounted with bonding material having a meniscoidal outer surface and with bonding material having a flattened outer surface. The transducer used was a piezoelectric element of lead zirconate titanate having a resonant frequency of 1.35 megahertz and dimensions of one-half inch in diameter and 0.05 inch in thickness. In a test carried out ith the outer surface of the bonding material in its original curved configuration corresponding to broken line 50b in FIG. 2, the directivity angle $\theta$, as defined above, as 5.5°. After the milling the bonding material to form a flattened outer face as shown in FIG. 2, an additional test was carried out and the directivity angle $\theta$ was found to be 4.1. In addition, the amplitude of the survey signal was substantially increased. In this regard, in the first test carried out with a curved outer surface of the bonding material, the peak-to-peak voltage of the received survey signal was 0.18 volt. After milling the bonding material to provide a flattened outer face, the peak-to-peak voltage had increased substantially to a value of 0.57 volt.

What is claimed is:

1. In an elongated acoustic logging tool adapted to be moved longitudinally through a well, the combination comprising:
   a transducer support rotatably mounted in a liquid-filled compartment of said tool;
   a transducer mounted on said support and having an outwardly oriented active face; and
   bonding material covering said transducer to secure said transducer to said support, said bonding material having a flattened outer surface opposite the active face of said transducer.

2. In an acoustic logging tool adapted to be moved longitudinally through a well, the combination comprising:
   a transducer support rotatably mounted in a liquid-filled compartment of said logging tool;
   a transducer mounted on said support and having an outwardly oriented active face; and
   bonding material covering said transducer to secure said transducer to said support, said bonding material having a flattened outer surface opposite the active face of said transducer and including a fillet portion which provides an inclined outer surface which slopes from said flattened outer surface to said transducer support in the direction of rotation of said support.

References Cited

UNITED STATES PATENTS

| 2,868,311 | 1/1959 | Tullos | 181—0.5 |
| 3,409,869 | 11/1968 | McCool et al. | 340—9 |

RICHARD A. FARLEY, Primary Examiner

C. E. WANDS, Assistant Examiner

U.S. Cl. X.R.

340—8